(12) United States Patent
Ismail et al.

(10) Patent No.: US 9,488,129 B1
(45) Date of Patent: Nov. 8, 2016

(54) PASSIVE EDGE-TONE SUPPRESSION METHOD

(71) Applicant: KING FAHD UNIVERSITY OF PETROLEUM AND MINERALS, Dhahran (SA)

(72) Inventors: Mohamed Yunus Mohamed Ismail, Tamil Nadu (IN); Mohammed Khalil Ibrahim Iraqi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/711,697

(22) Filed: May 13, 2015

(51) Int. Cl.
*F02K 1/40* (2006.01)
*F02K 1/44* (2006.01)
*F02K 1/00* (2006.01)

(52) U.S. Cl.
CPC ............ *F02K 1/44* (2013.01); *F05D 2220/323* (2013.01); *F05D 2240/128* (2013.01); *F05D 2260/96* (2013.01)

(58) Field of Classification Search
CPC ...... F02K 1/44; F02K 1/34; F05D 2220/323; F05D 2240/128; F05D 2260/96
USPC .................. 181/213, 217, 218, 203; 244/1 N
See application file for complete search history.

(56) References Cited

U.S. PATENT DOCUMENTS

| | | | | |
|---|---|---|---|---|
| 2,949,164 A * | 8/1960 | Morgan | .................... | B64F 1/26 181/217 |
| 3,174,581 A * | 3/1965 | Duthion | .................... | B64F 1/26 181/217 |
| 3,187,835 A * | 6/1965 | Smith | ....................... | B64F 1/26 181/217 |
| 3,543,876 A | 12/1970 | Karlson | | |
| 3,684,054 A * | 8/1972 | Lemmerman | ......... | F01D 25/305 181/203 |
| 3,899,923 A * | 8/1975 | Teller | ....................... | F01N 3/04 181/221 |
| 3,905,445 A * | 9/1975 | Scharton | .................... | F02K 1/40 181/213 |
| 4,398,667 A * | 8/1983 | Maestrello | ................ | F02K 1/34 239/265.17 |
| 5,325,661 A * | 7/1994 | Rice | ......................... | F02K 1/386 181/213 |
| 5,402,964 A * | 4/1995 | Wygnanski | ............... | F02K 1/44 181/213 |
| 5,663,536 A * | 9/1997 | Kaplan | ..................... | F28C 1/10 181/224 |
| 6,092,621 A * | 7/2000 | Kinzie | ...................... | B64F 1/26 181/217 |
| 7,886,543 B2 * | 2/2011 | Vincent | ..................... | F02K 1/04 181/213 |
| 8,177,496 B2 | 5/2012 | Wilson et al. | | |
| 8,381,527 B2 | 2/2013 | LaForest et al. | | |
| 8,640,820 B2 * | 2/2014 | Caeti | ......................... | F02K 1/34 181/213 |
| 9,261,047 B2 * | 2/2016 | Domel | .................... | F02K 1/383 |
| 2015/0047921 A1 | 2/2015 | Disimile | | |

* cited by examiner

*Primary Examiner* — Edgardo San Martin
(74) *Attorney, Agent, or Firm* — Richard C. Litman

(57) ABSTRACT

The passive edge-tone suppression method includes the step of inserting a central insertion tube within a nozzle to disturb jet oscillations in a flow field of an edge-tone feedback loop. The central insertion tube can have a diameter of 200 micrometers and can be inserted within a center of the nozzle. The method also includes the step of extending the central insertion tube through the nozzle and into an alignment with the edge producing the edge tone. Further, the method includes the step of increasing a length of the central insertion tube in relation to a stand-off distance between the nozzle and the edge. The length of the central insertion tube can be increased to a length of about 30 percent of the stand-off distance.

3 Claims, 23 Drawing Sheets

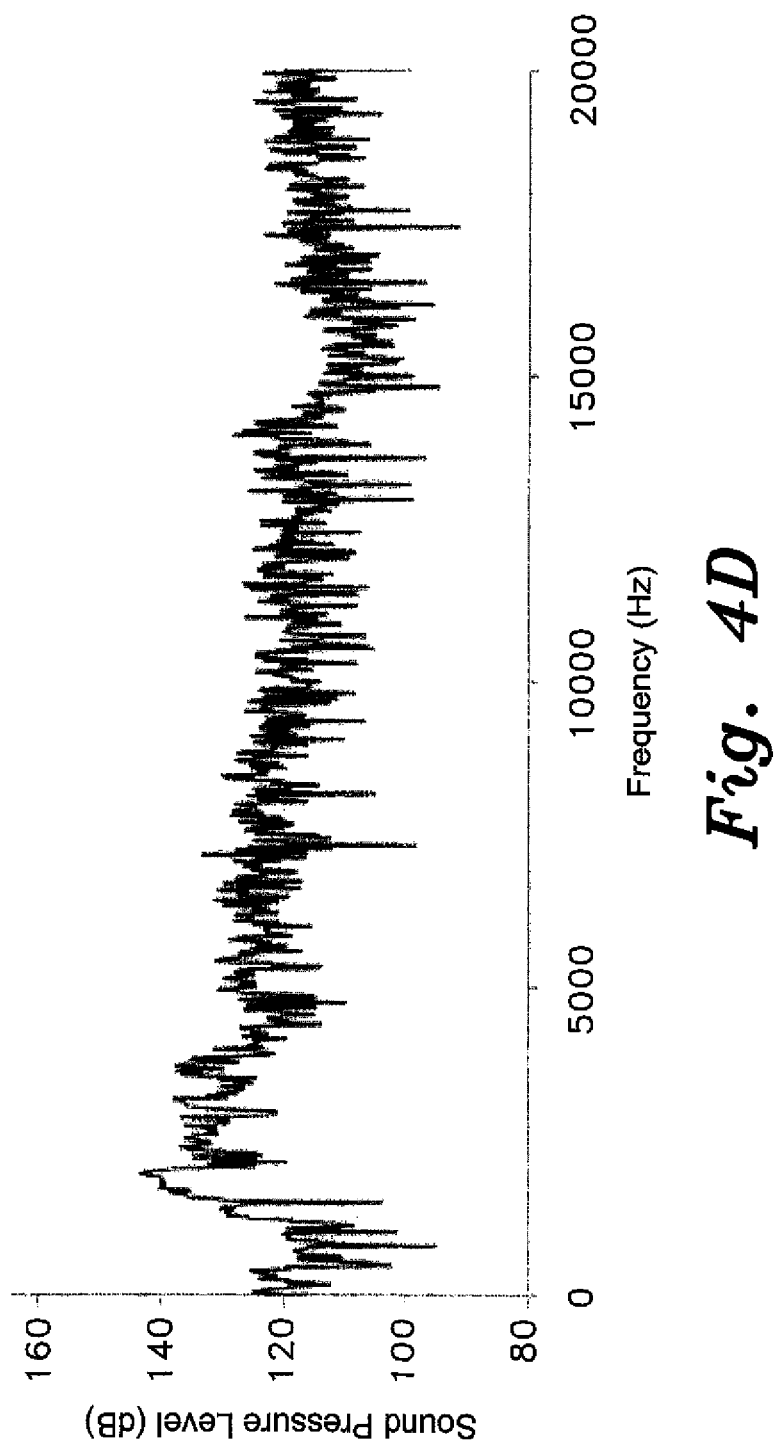

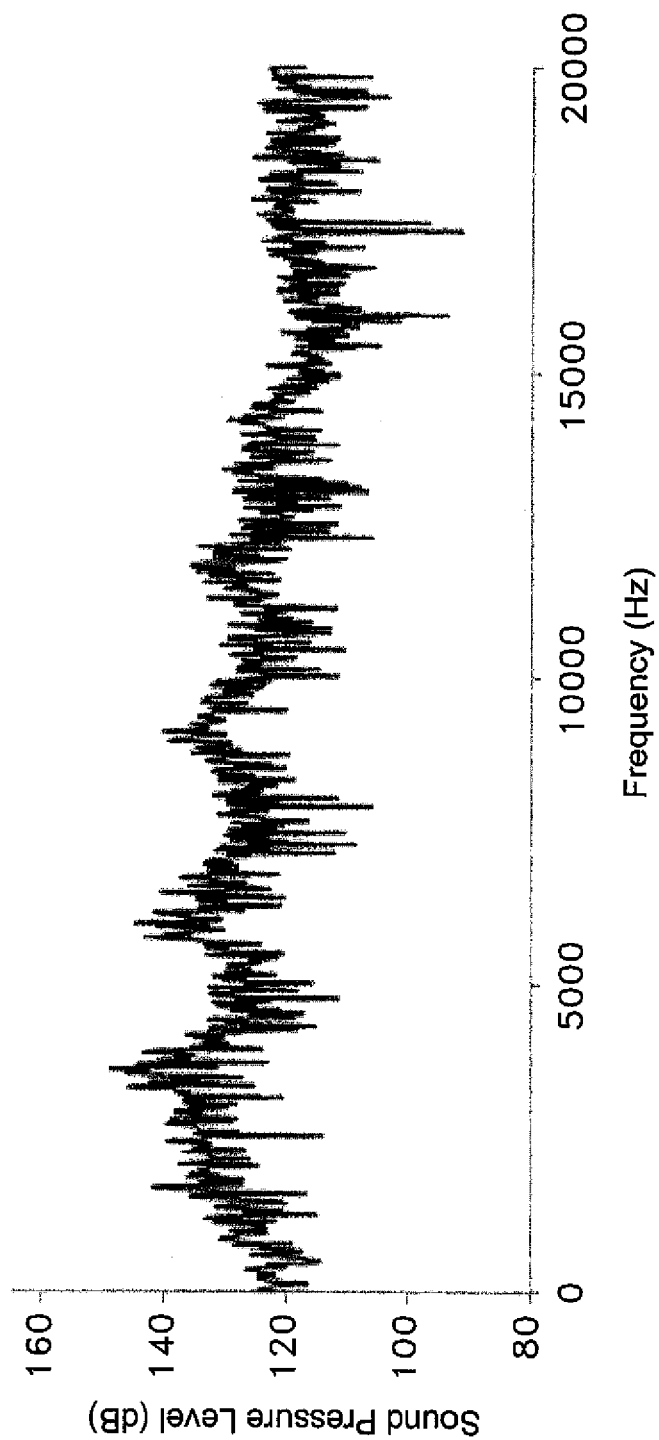

PASSIVE EDGE-TONE SUPPRESSION METHOD

BACKGROUND OF THE INVENTION

1. Field of the Invention

The present invention relates to jet aviation noise, and particularly to a passive edge-tone suppression method.

2. Description of the Related Art

In modern aviation industry, every day many commercial aircrafts take-off and land at different countries across the globe, producing undesirable noise pollution to the nearby communities. The noises produced by aircraft components, such as the wings, slats, flaps, and landing gear, among others, are some of the vital sources of sound. Even in fighter/bomber weapons bays, at moderately high speeds, open cavities can produce undesirable noises. This can lead to the structural fatigue of internally carried weapons, their suspension equipment, and the structural loads on the parent aircraft.

Researchers have included the oscillations from the flutter of aircraft wings in the class of self-sustained oscillations, since the vibration results through partial conversion of energy from a steady flow into oscillations. Self-sustained shear oscillations are found in various shear layer impingement configurations, which are responsible for the flow-induced noise and vibration. This can result in unwanted structural loading, and appears in a range of applications, such as transonic wind tunnels, aircraft components, slotted flumes, high-head gates, velocity probes, and pressure probes, among other applications. Flow-induced noise sources are one of the relatively complicated flows, which can be challenging to simulate.

Edge-tone, a typical phenomenon of these self-sustained shear oscillations, is generated when a jet of air impinges on an edge or the sharp edge corner of a wedge. When the free shear layer near the nozzle lip is excited, a disturbance is initiated and convected downstream and amplified. Further, if the disturbance is unstable, it forms into organized vortices. When these vortices impinge on the edge, pressure waves are generated and propagate upstream to the nozzle lip, producing another disturbance near the nozzle lip. This upstream propagating sound and the convected downstream disturbances constitute a feedback loop.

Since the edge-tone is a loud noise with high amplitude, it could lead to structural damage. Therefore, attempts to suppress edge-tone have been undertaken. Although these attempts have met with some success, there is still a need for a technique that reduces the jet noise effectively.

Thus, a passive edge-tone suppression method solving the aforementioned problems is desired.

SUMMARY OF THE INVENTION

The passive edge-tone suppression method includes the step of inserting a central insertion tube within a nozzle to disturb jet oscillations in a flow-field of an edge-tone feedback loop. By disturbing the jet oscillation, the feedback loop is weakened, which results in a reduction of edge-tone amplitude. The central insertion tube can have a diameter of 200 micrometers and can be inserted within the center of the nozzle. The method further includes the steps of extending the central insertion tube through the nozzle into alignment with an edge and increasing the length of the central insertion tube in relation to a stand-off distance between the nozzle and the edge. The length of the central insertion tube can be increased to a length of about 30 percent of the stand-off distance.

These and other features of the present invention will become readily apparent upon further review of the following specification and drawings.

BRIEF DESCRIPTION OF THE DRAWINGS

FIG. 4D is a plot of sound pressure level for a main jet at $M=0.87$, $d/h=0.1666$ where the central insertion tube has a length $d/l_t=0.300$.

FIG. 7B is a plot of sound pressure level for a main jet at $M=0.87$, $d/h=0.1428$ where the central insertion tube has a length $d/l_t=0.750$.

Similar reference characters denote corresponding features consistently throughout the attached drawings.

DETAILED DESCRIPTION OF THE PREFERRED EMBODIMENTS

The passive edge-tone suppression method is a flow control technique to suppress edge-tones. More specifically, the passive edge-tone suppression method suppresses an edge-tone amplitude generated by a jet engine to avoid the sonic fatigue failure of any nearby structure. The passive edge-tone suppression method involves the step of inserting a central insertion tube into a jet plume at a center of a jet nozzle exit to suppress the discrete edge-tone. This leads to a weakness in the interactions between the upstream propagating acoustic waves and downstream propagating hydrodynamic waves near the shear layers at the jet nozzle exit.

Figure 1:
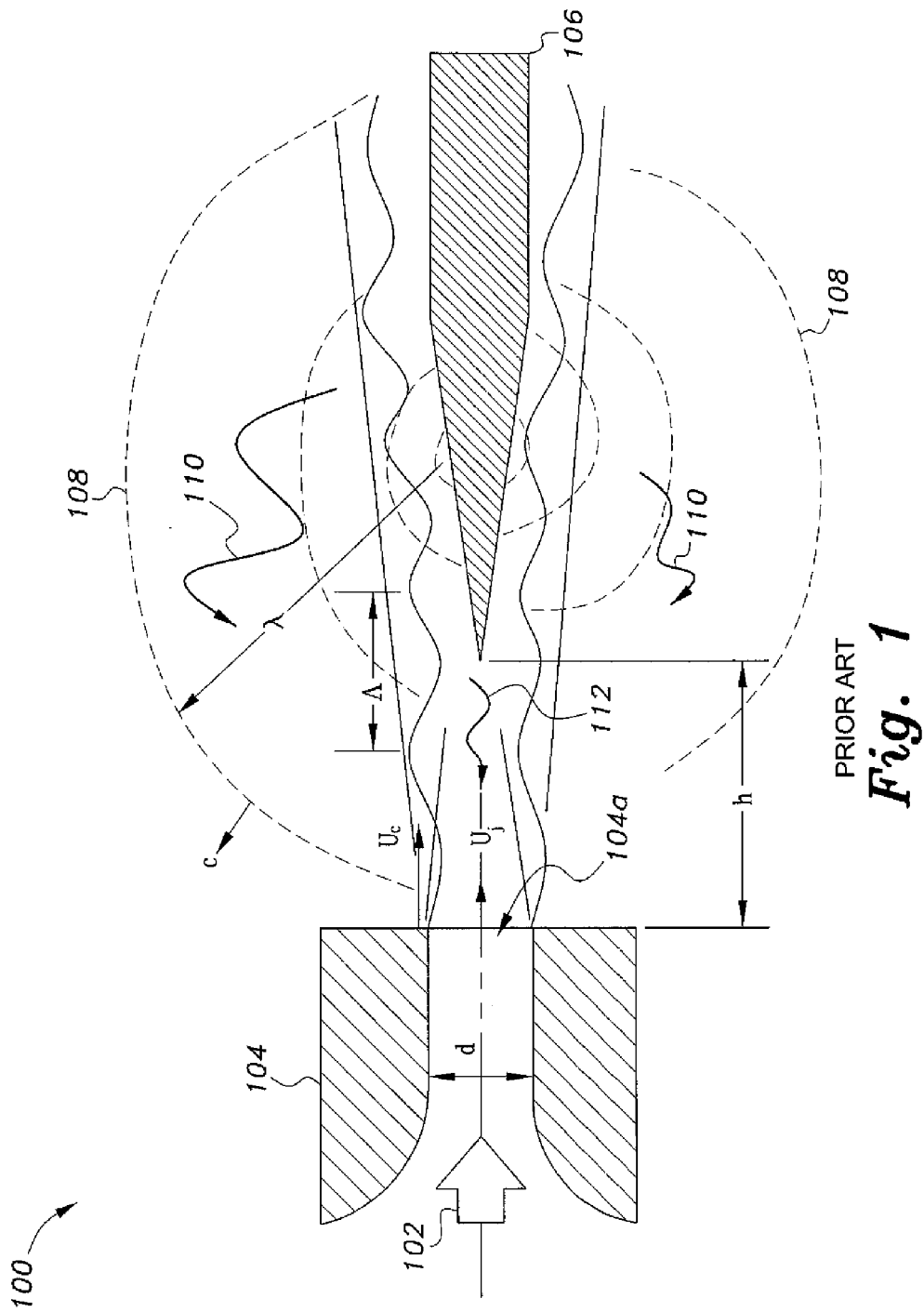
FIG. 1 is a schematic diagram showing of the prior art formation of an edge-tone feedback loop in a jet nozzle.

Referring to FIG. 1, a schematic of a typical, prior art edge-tone feedback system 100 is shown. In the edge-tone feedback system 100, a jet plume 102 enters and passes through a jet nozzle 104. The jet plume 102 passes through and exits the jet nozzle 104 at a nozzle exit 104a. The jet plume 102 continues past the jet nozzle 104 and interacts with an edge 106. Specifically, the jet plume 102 collides with a wedge tip 106b of a wedge 106a of the edge 106. As the jet plume 102 collides with the wedge tip 106b, and undesirable noise is generated. The undesirable noise is represented as an acoustic wave 108, that includes an "outside the jet" feedback wave 110 and an "inside the jet" feedback wave 112. As illustrated in FIG. 1, capital lambda (Λ) represents a downstream propagating wavelength, and lower case lambda (λ) represents an upstream propagating wavelength.

Figure 2A:
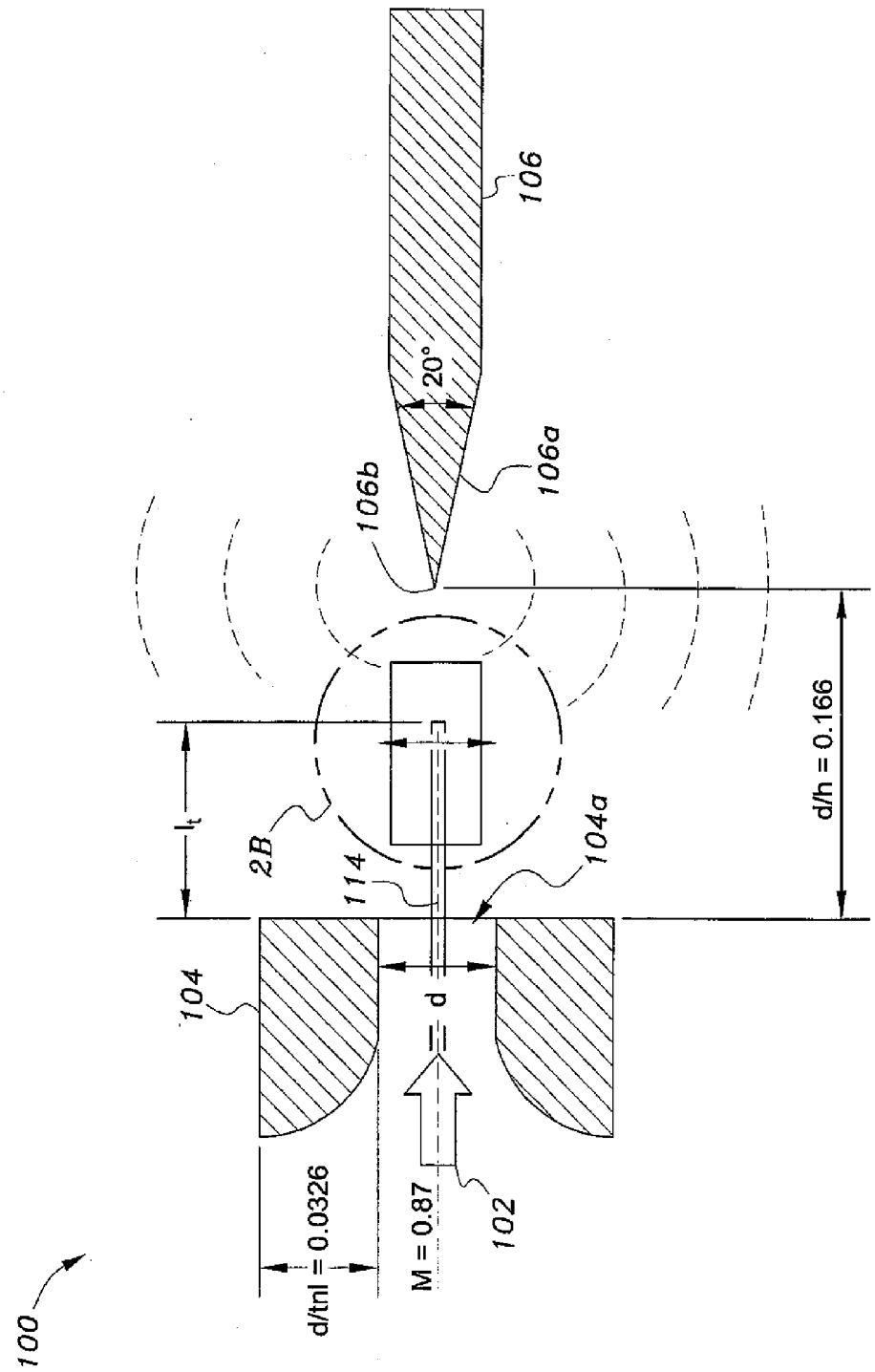
FIG. 2A is a schematic diagram showing use of a central insertion tube in a passive edge-tone suppression method according to the present invention.
Figure 2B:
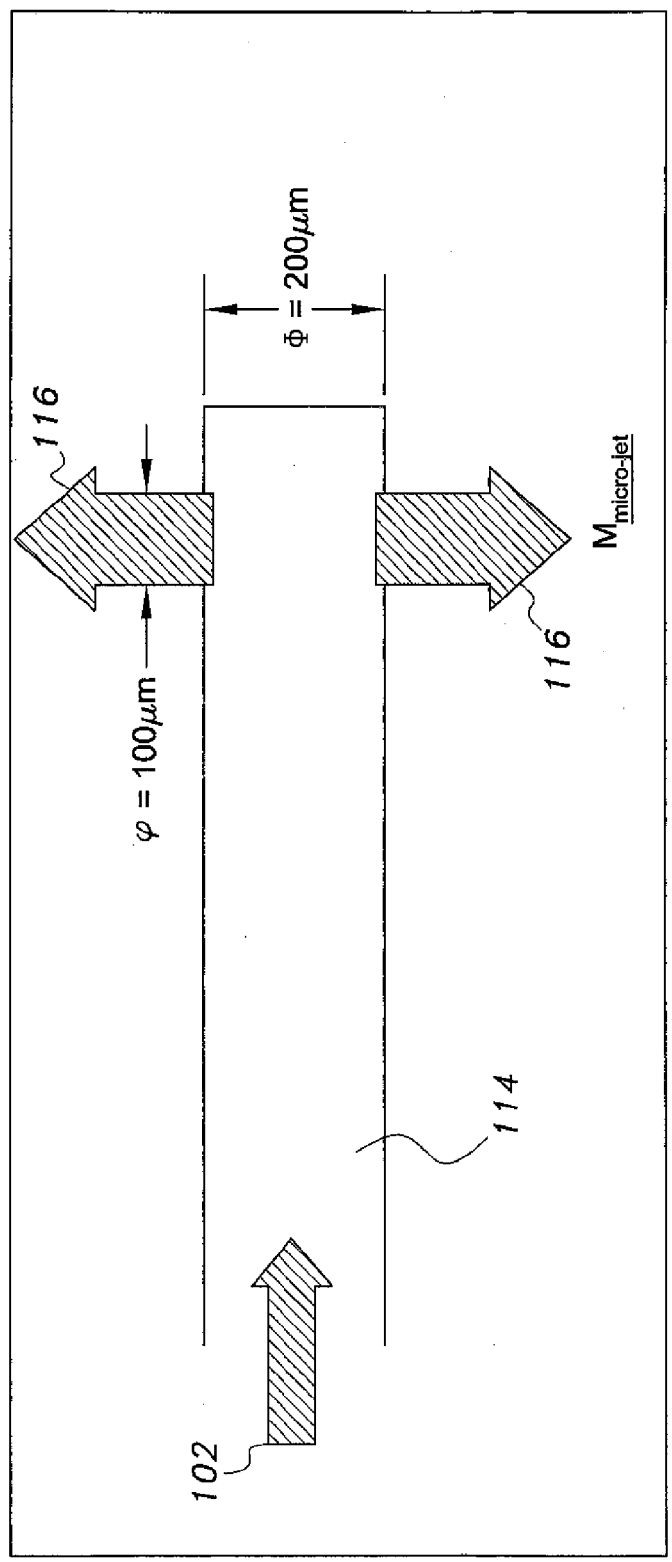
FIG. 2B is a detail schematic diagram illustrating two microjet injection ports defined in the central insertion tube of FIG. 2A.

In FIGS. 2A and 2B, two microjets 116 with diameters of ϕ=100 micrometer (μm) are introduced inside a high speed edge-tone test case. As shown in FIG. 2, the jet plume 102 passes through the jet nozzle 104 and interacts with a central insertion tube 114. As shown specifically in FIG. 2B, the central insertion tube 114 includes the microjets 116 defined therein. Microjets 116 are injected at different Mach numbers, specifically; M=0, 0.87, 1, and 1.42, at d/lt=0.300 and d/h=0.1666. The central insertion tube 114 has a diameter of Φ=200 μm, and the main jet at exit has a Mach number of M=0.87.

For a supersonic microjet, the Mach number is equal to M=1.42, and it is achieved by adjusting the microjet exit pressure to make the microjet 116 injection chocked at the nozzle exit 104a. Consequently, the exit speed is a sonic speed and it can expand outside the central insertion tube 114 to reach a maximum at M=1.42. The central insertion tube diameter is selected to provide the required mass flow rate of gas for microjet injections at its end, and it is presented in Table 1 shown below.

TABLE 1

Mass flow rate of microjets for different speeds

| Microjet Mach Number | Mass Flow Rate (kg/s) |
|---|---|
| 0 | 0 |
| 0.87 | 0.03814 |
| 1 | 0.04475 |
| 1.42 | 0.069 |

Figure 3A:
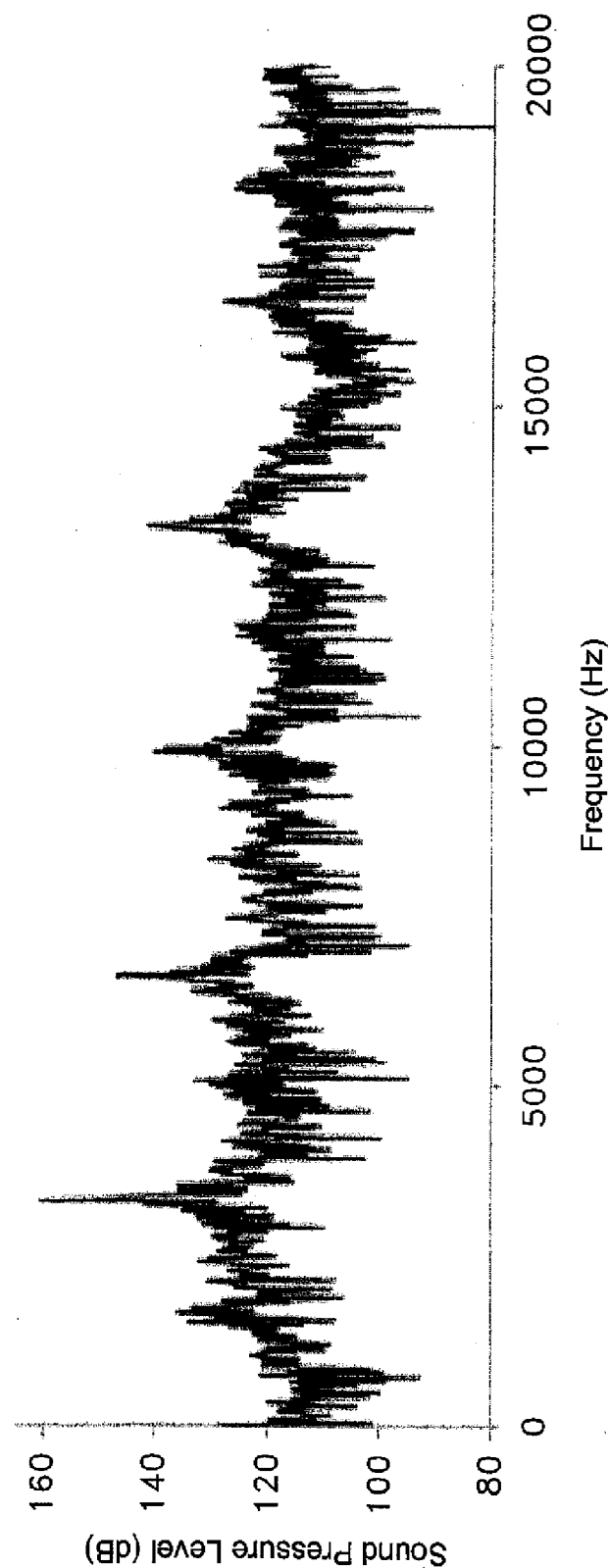
FIG. 3A is a plot of sound pressure level for a main jet at $M=0.87$, $d/h=0.166$ and $dl_t=0.300$ with a baseline jet.
Figure 3B:
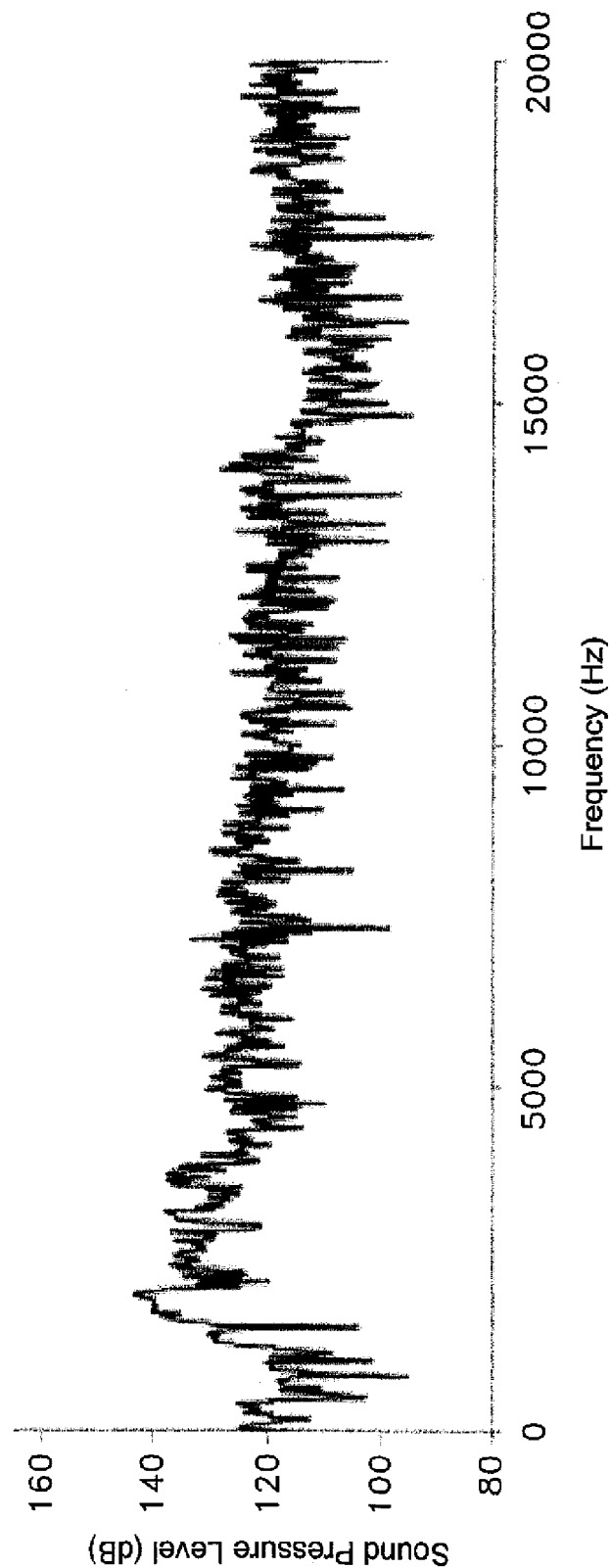
FIG. 3B is a plot of sound pressure level for a main jet at $M=0.87$, $d/h=0.166$ and $d/l_t=0.300$ with no microjet injection.
Figure 3C:
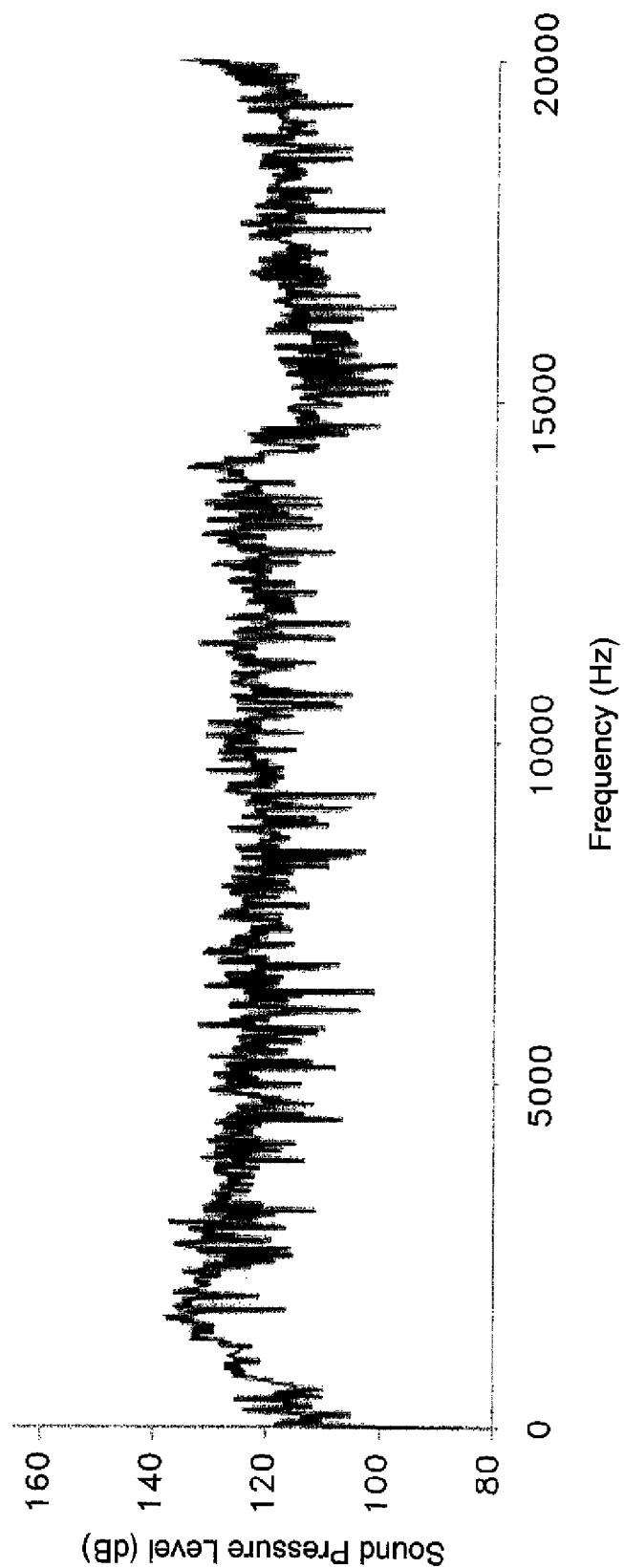
FIG. 3C is a plot of sound pressure level for a main jet at $M=0.87$, $d/h=0.166$ and $d/l_t=0.300$ with microjet injection at $M=0.87$.
Figure 3D:
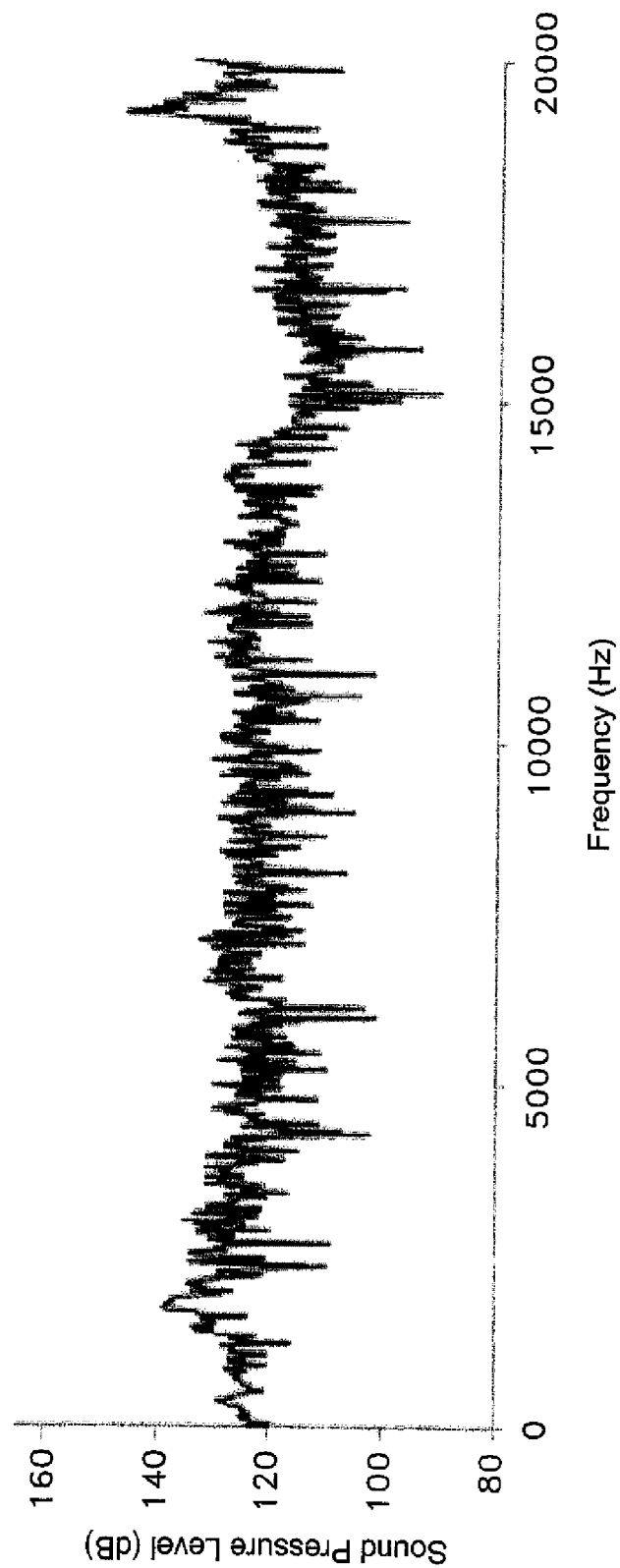
FIG. 3D is a plot of sound pressure level for a main jet at $M=0.87$, $d/h=0.166$ and $d/l_t=0.300$ with microjet injection at $M=1$.
Figure 3E:
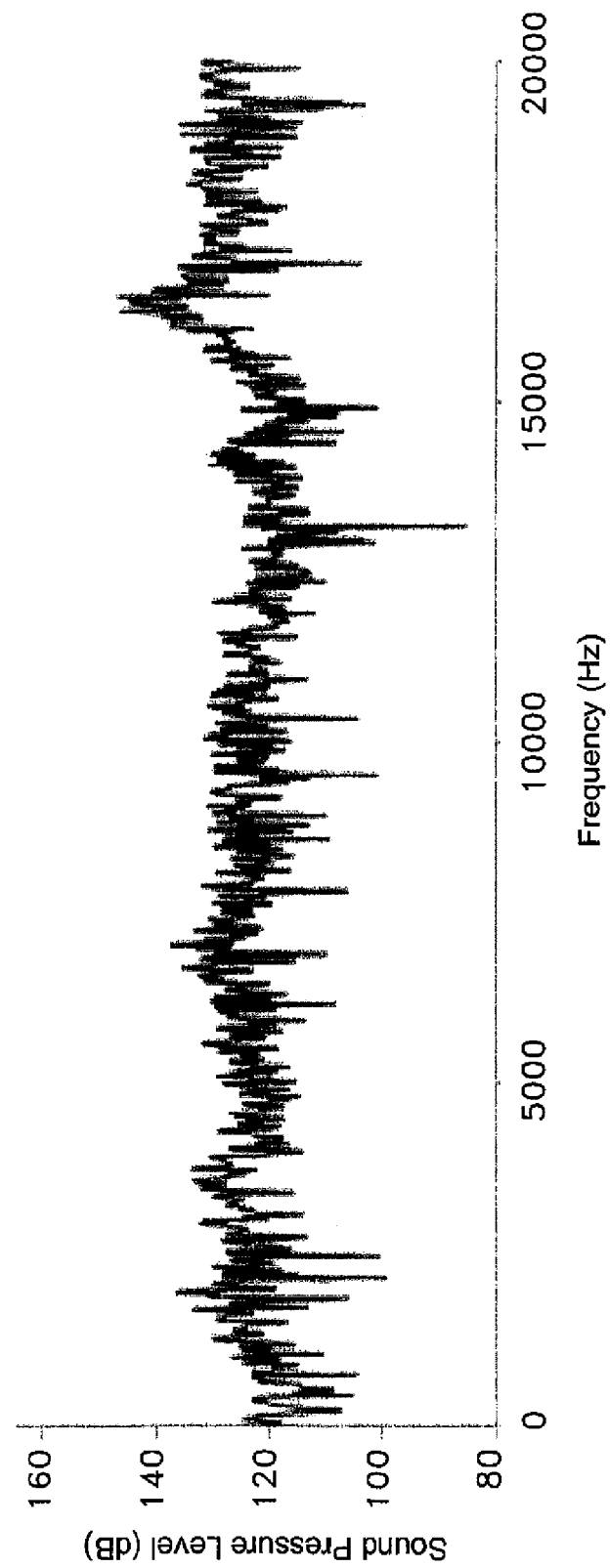
FIG. 3E is a plot of sound pressure level for a main jet at $M=0.87$, $d/h=0.166$ and $d/l_t=0.300$ with microjet injection at $M=1.42$.

Velocity contours and the comparison of sound pressure level (SPL) are shown in FIGS. 3A, 3B, 3C, 3D, and 3E. It is observed from the velocity contours that the jet shear layer is forced to shift or bulge outward in the vicinity of the microjet injection. It is clear from FIG. 3 that the cases with different speeds of microjet injections suppressed the edge-tone amplitude due to their interaction with the main jet shear layer. The results proved that microjet injection inside the jet plume 102 has almost the same effect on reducing edge-tone amplitude as the no microjet injection' case, in which the edge-tone amplitude is suppressed. Specifically in FIGS. 3A, 3B, 3C, 3D, and 3E, a comparison of SPL for main jet at M=0.87, d/h=0.166 and d/lt=0.300 with different microjet speeds, where FIG. 3A is baseline jet, FIG. 3B is with no microjet injection, FIG. 3C is with microjet injection at M=0.87, FIG. 3D is at M=1, and FIG. 3E is at M=1.42.

Figure 4A:
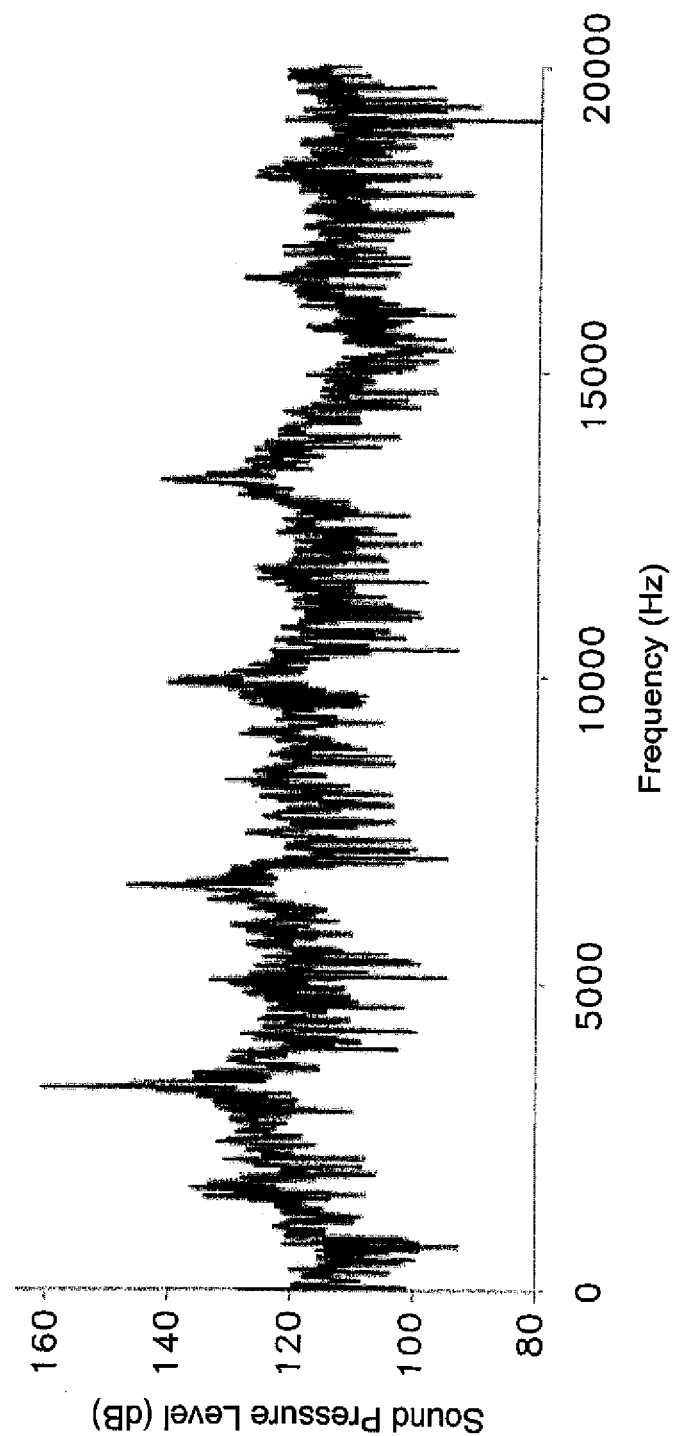
FIG. 4A is a plot of sound pressure level for a main jet at $M=0.87$, $d/h=0.1666$ with a baseline jet where the central insertion tube has a length $l_t=0$ mm.
Figure 4B:
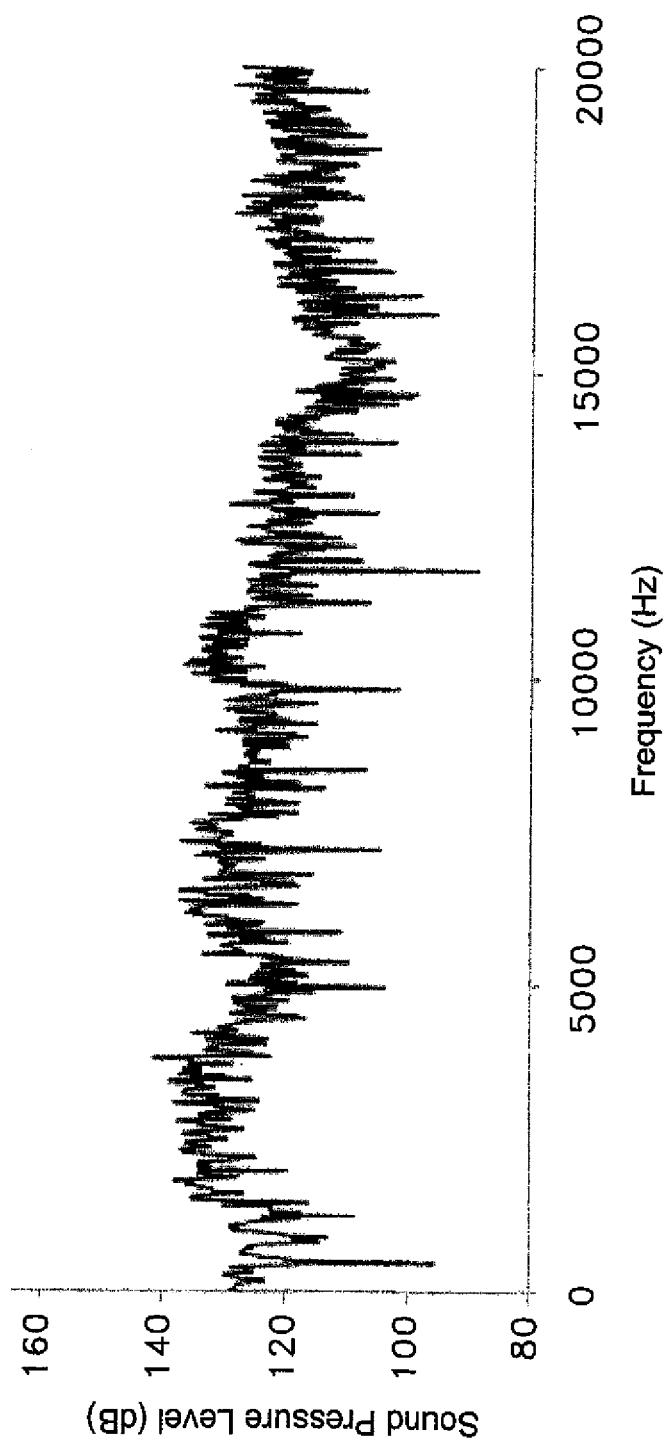
FIG. 4B is a plot of sound pressure level for a main jet at $M=0.87$, $d/h=0.1666$ where the central insertion tube has a length $d/l_1=0.500$.
Figure 4C:
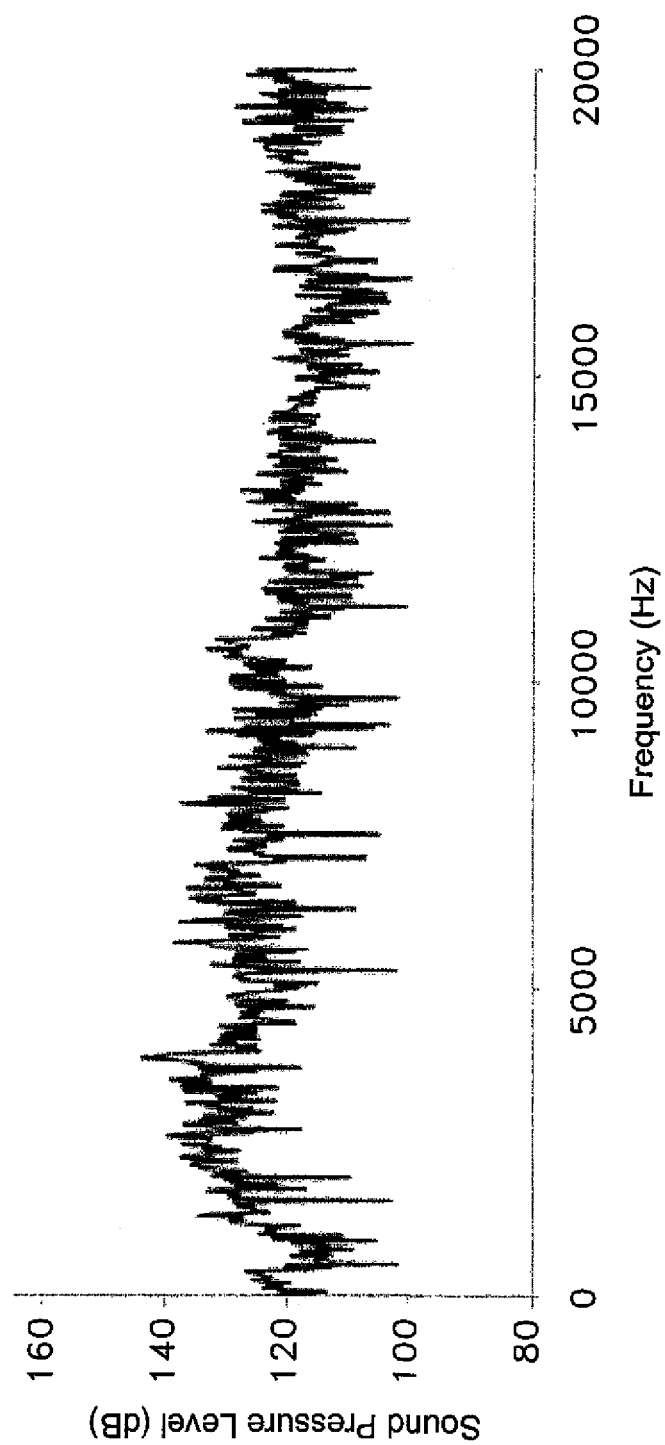
FIG. 4C is a plot of sound pressure level for a main jet at $M=0.87$, $d/h=0.1666$ where the central insertion tube has a length $d/l_t=0.375$.

The no microjet injection case suggests that central insertion tube 114 plays a vital role in reducing the edge-tone amplitude. To study the effect of the tube length, different central insertion tube lengths, d/$l_t$, are considered in FIGS. 4A, 4B, 4C, and 4D. Specifically, 0.500, 0.375 and 0.300 are considered for simulations with main jet at M=0.87, and d/h=0.1666. Comparison of the SPL is shown in FIGS. 4A, 4B, 4C, and 4D, which proves that the central insertion tube 114 reduces the amplitude of the edge-tone. Specifically, FIGS. 4A, 4B, 4C, and 4D show the comparison of SPL for main jet at M=0.87, d/h=0.1666, and different lengths of central insertion tube without microjet injection, d/$l_t$, where FIG. 4A is baseline jet where $l_t$=0 mm, FIG. 4B is where d/$l_1$=0.500, FIG. 4C is where d/$l_t$=0.375, and FIG. 4D is where d/$l_t$=0.300.

Figure 5A:
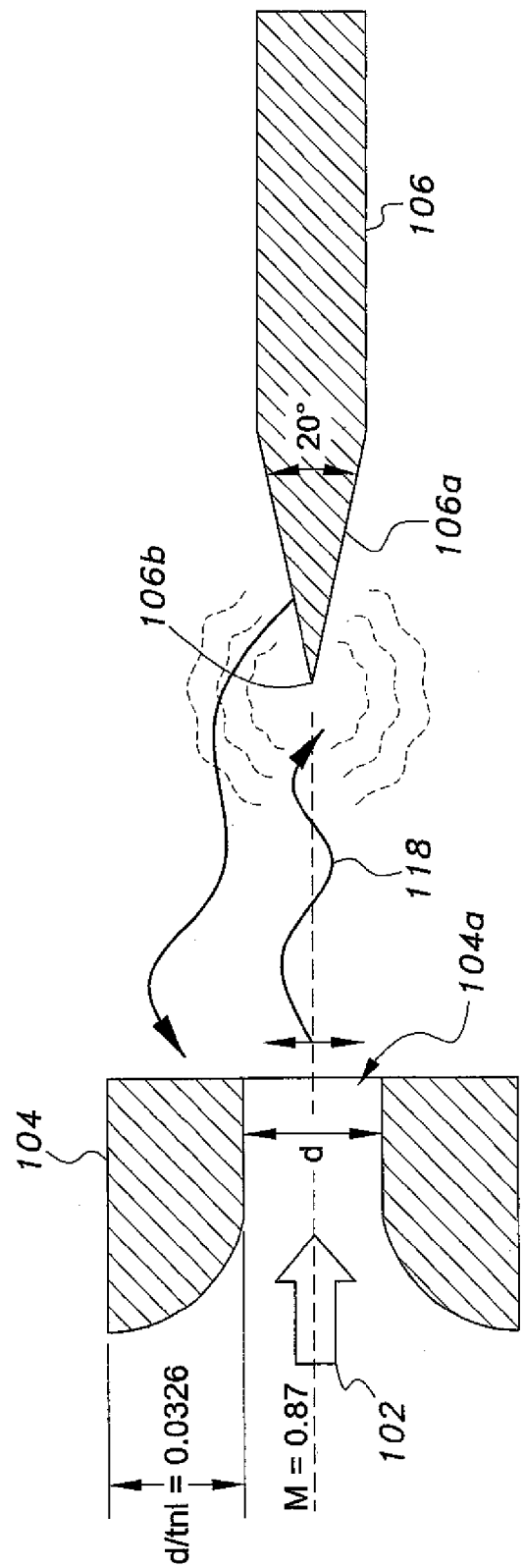
FIG. 5A is a schematic diagram of baseline jet flow oscillation in a jet nozzle.
Figure 5B:
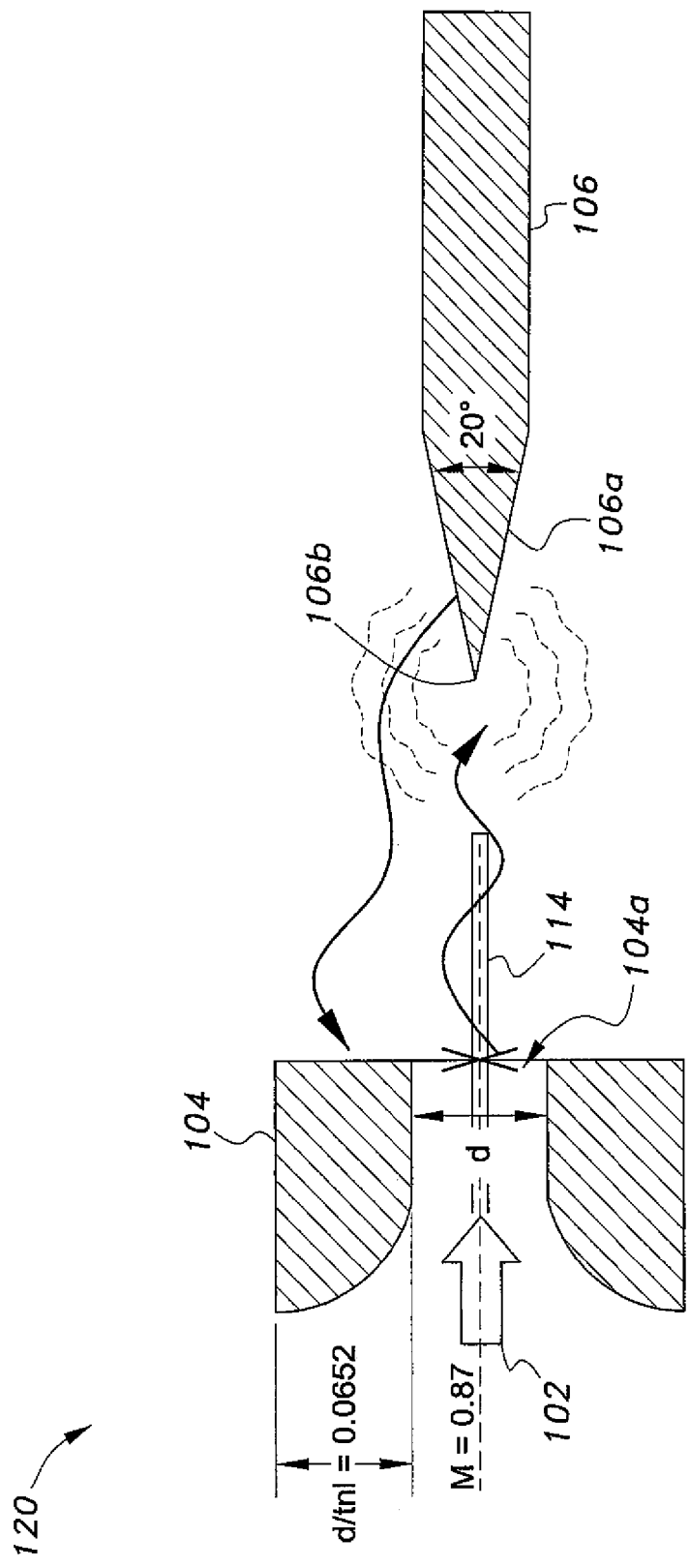
FIG. 5B is a schematic diagram of baseline jet flow oscillation in a jet nozzle where a central insertion tube without microjet injection in inserted in the nozzle in a passive edge-tone suppression method according to the present invention.

The suppression mechanism in the passive edge-tone suppression method can be explained as follows, and as illustrated in FIGS. 5A and 5B. When the central insertion tube 114 'without microjet injection' is introduced inside the jet plume 102, it disturbs the jet oscillations 118 in the flow field. In the edge-tone feedback system 100, the jet oscillation 118 completes one cycle at a time that is equivalent to the reciprocal of edge-tone frequency. Since the central insertion tube 114 disturbs the jet oscillation 118, it weakens the feedback loop, which results in reduction of edge-tone amplitude. FIG. 5A shows a schematic of baseline jet oscillation 118 where there is no central insertion tube 114. FIG. 5B shows the schematic of a system 120 using the passive edge-tone suppression method with the central insertion tube 114 and its resulting effect on the jet oscillation 118.

The phase variation along the centerline for the high speed baseline jet edge-tone case is studied in detail. It increased along the stand-off distance from nozzle exit 104a to the wedge tip 106b. When the central insertion tube 114 'without microjet injection' is inserted into the jet plume 102, it cuts the shear layer interaction between both the edges of the nozzle lip throughout its length (d/$l_t$). The separated shear layer is forced to flow and interact in the remaining stand-off distance (i.e. d/h–d/$l_t$), thereby reducing the jet oscillations 118, as seen in FIG. 5B. It also affects the phase variation along the stand-off distance. The central insertion tube 114 limits the jet oscillations 118 in the flow field of the edge-tone system and results in the suppression of edge-tone amplitude, as shown in FIG. 5B, and no microjet 116 injection is needed.

Figure 6:
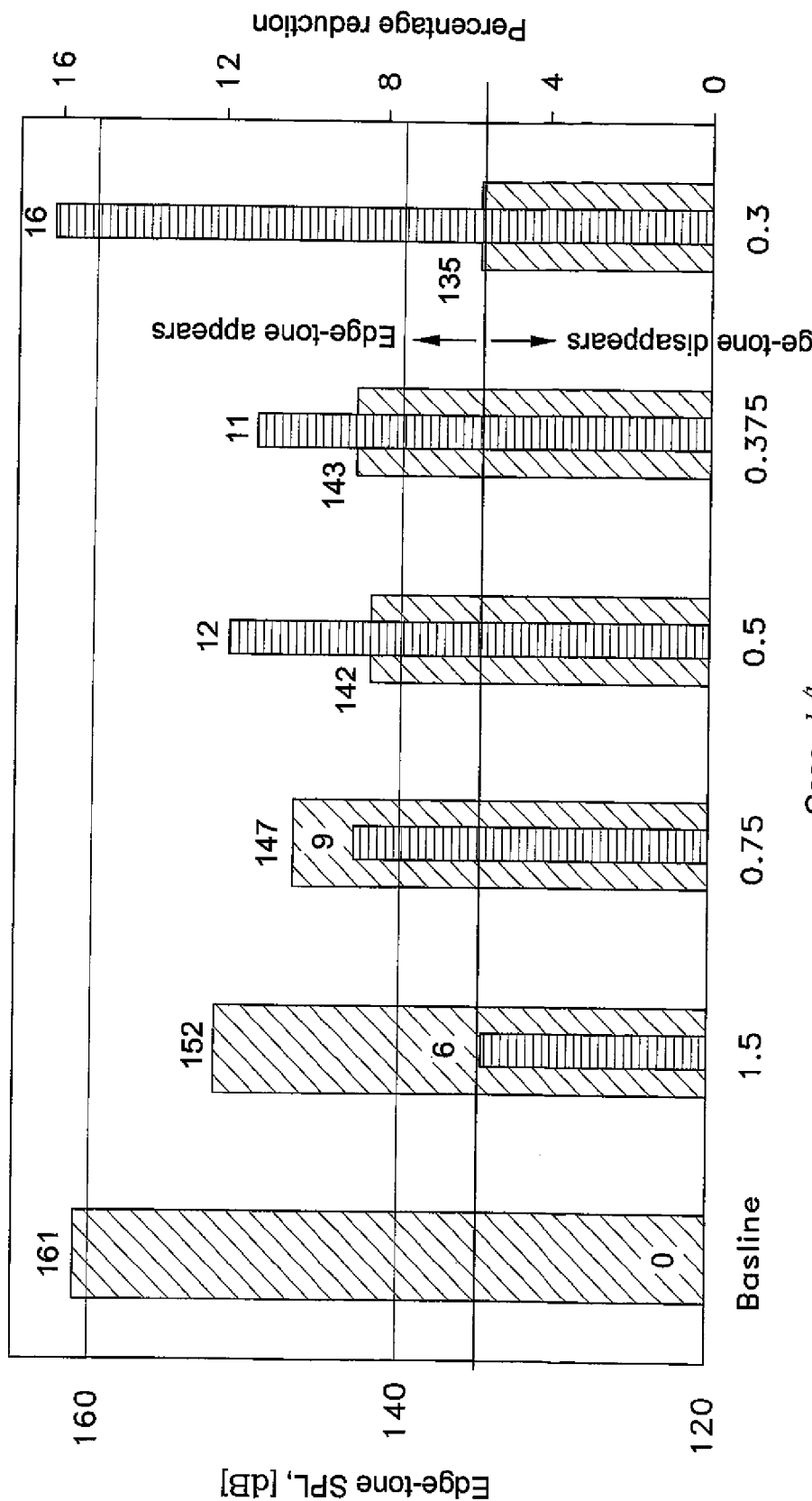
FIG. 6 is a chart showing edge-tone sound pressure level (SPL) reduction and the percentage edge-tone SPL reduction using the passive edge-tone suppression method according to the present invention.

This control approach is very successful in disrupting the jet oscillations 118, which led to dramatic reductions in the edge-tone amplitude (17 dB) when a tube of length, $d/l_t$=0.375 is inserted into the jet plume 102 having Mach number of M=0.87. To understand the relation between the stand-off distance and central insertion tube length, different lengths of central insertion tubes 114 are placed inside the jet plume 102 for two different stand-off distances, d/h, specifically, d/h=0.1428 and d/h=0.0869. A summary of simulated cases are shown in FIG. 6, along with reduction percentage of SPL compared to the baseline case. As the length of the central insertion tube 114 decreases, the edge-tone amplitude increases and the percentage reduction decreases.

Figure 7A:
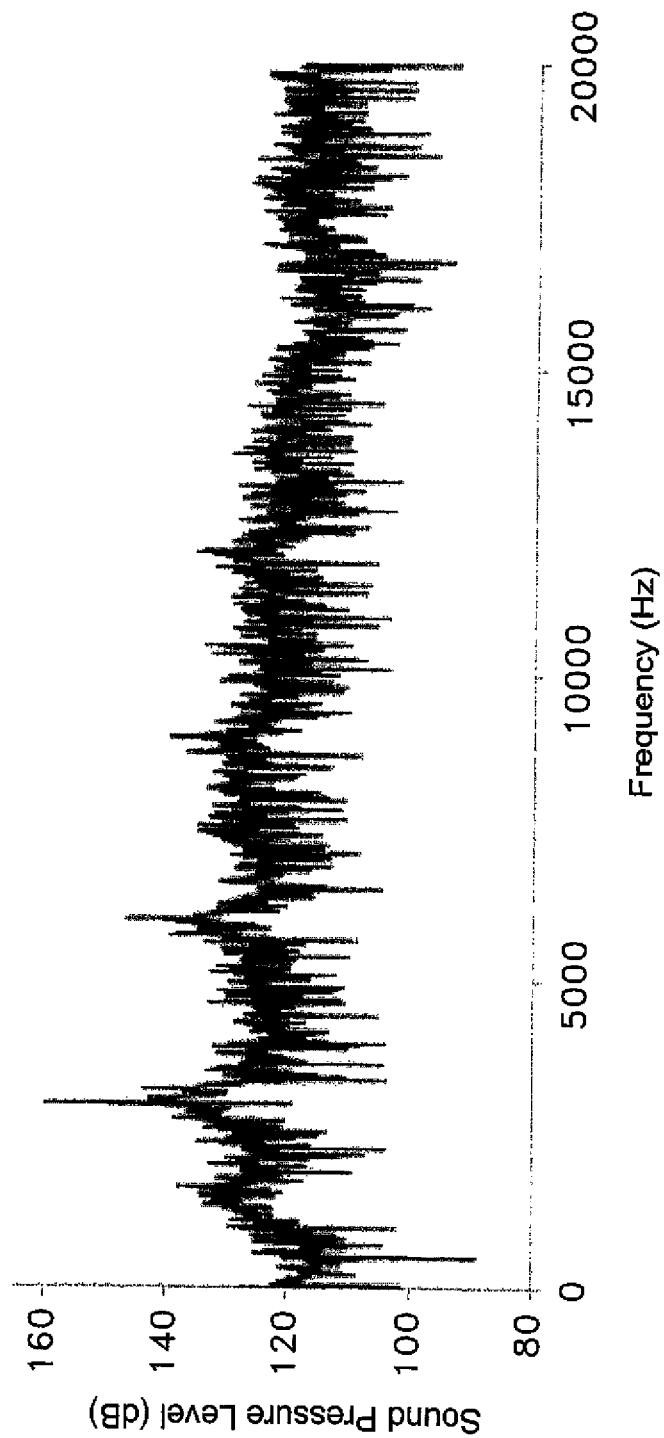
FIG. 7A is a plot of sound pressure level for a main jet at $M=0.87$, $d/h=0.1428$ with a baseline jet where the central insertion tube has a length $l_t=0$ mm.
Figure 7C:
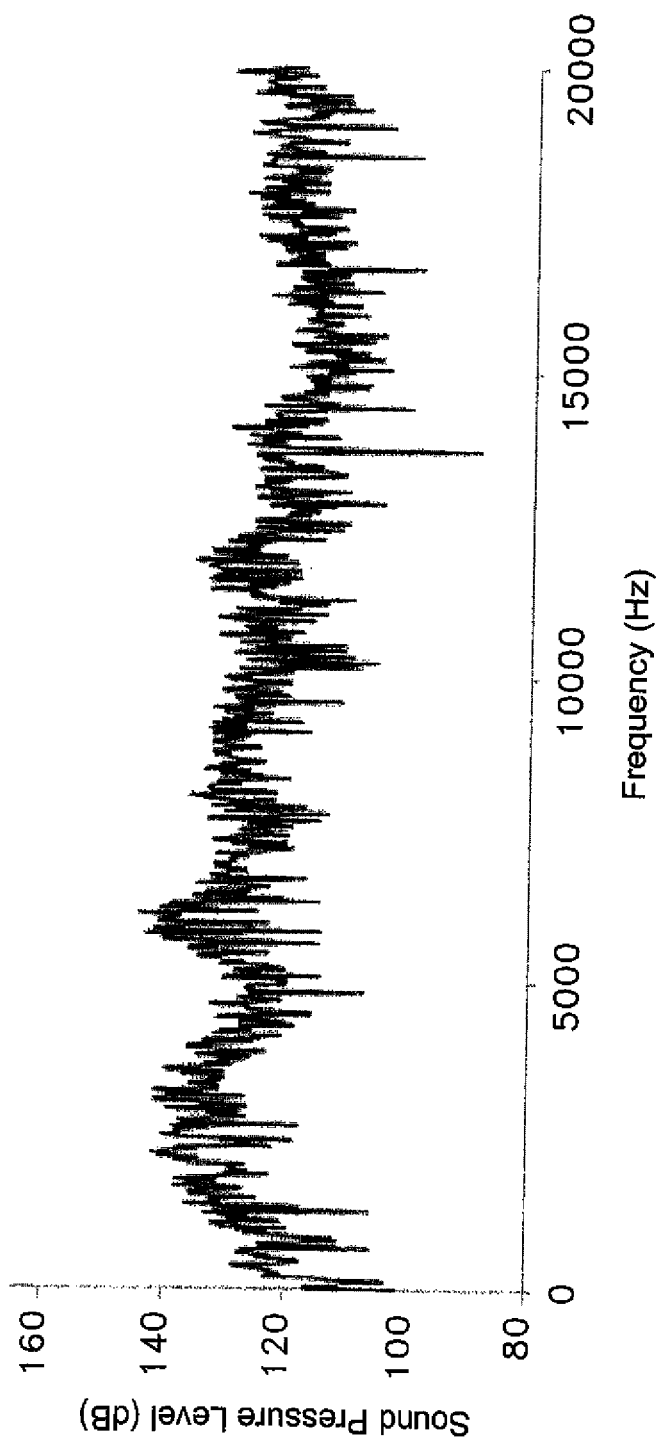
FIG. 7C is a plot of sound pressure level for a main jet at $M=0.87$, $d/h=0.1428$ where the central insertion tube has a length $d/l_t=0.500$.
Figure 7D:
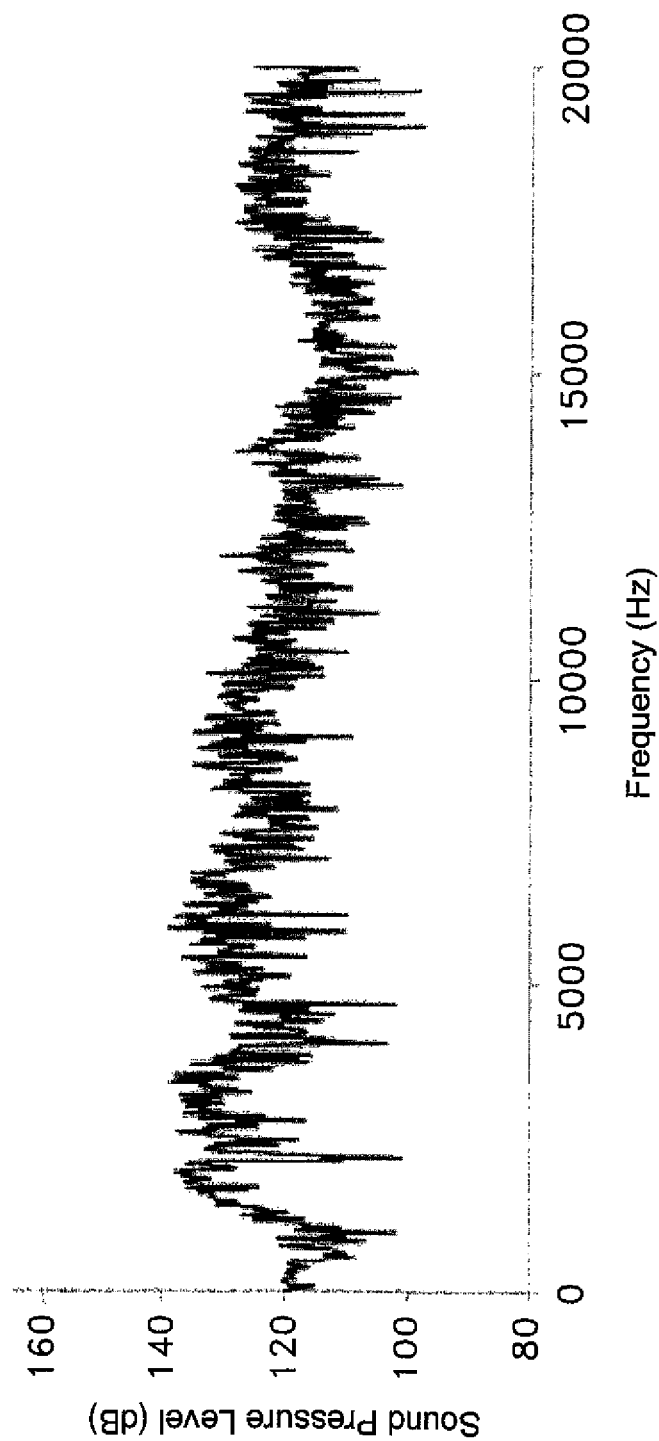
FIG. 7D is a plot of sound pressure level for a main jet at $M=0.87$, $d/h=0.1428$ where the central insertion tube has a length $d/l_t=0.375$.

FIGS. 7A, 7B, 7C, and 7D show the SPL for the case of a wedge 106a located at d/h of 0.1428, with baseline jet, and with central insertion tubes of different lengths, $d/l_t$, specifically $d/l_t$=0.750, 0.500, and 0.375. From these results the edge-tone amplitude is suppressed when the central insertion tube 114 of length, $d/l_t$=0.500 is inserted into the jet plume 102, which is 28.57 percent of the stand-off distance. From the various plots, it is also evident that when the central insertion tube 114 of length, $d/l_t$=0.500, is inserted into the jet plume 102, the edge-tone is suppressed, which is 33.33 percent of the stand-off distance. Specifically, FIGS. 7A, 7B, 7C, and 7D, show the comparison of SPL for main jet at M=0.87, d/h=0.1428, and different lengths of central insertion tube 114 without microjet 116 injection, $d/l_t$, where FIG. 7A is baseline jet where $l_t$=0 mm, FIG. 3B is $d/l_t$=0.750, FIG. 3C is $d/l_t$=0.500, and FIG. 3D is $d/l_t$=0.375.

Figure 8A:
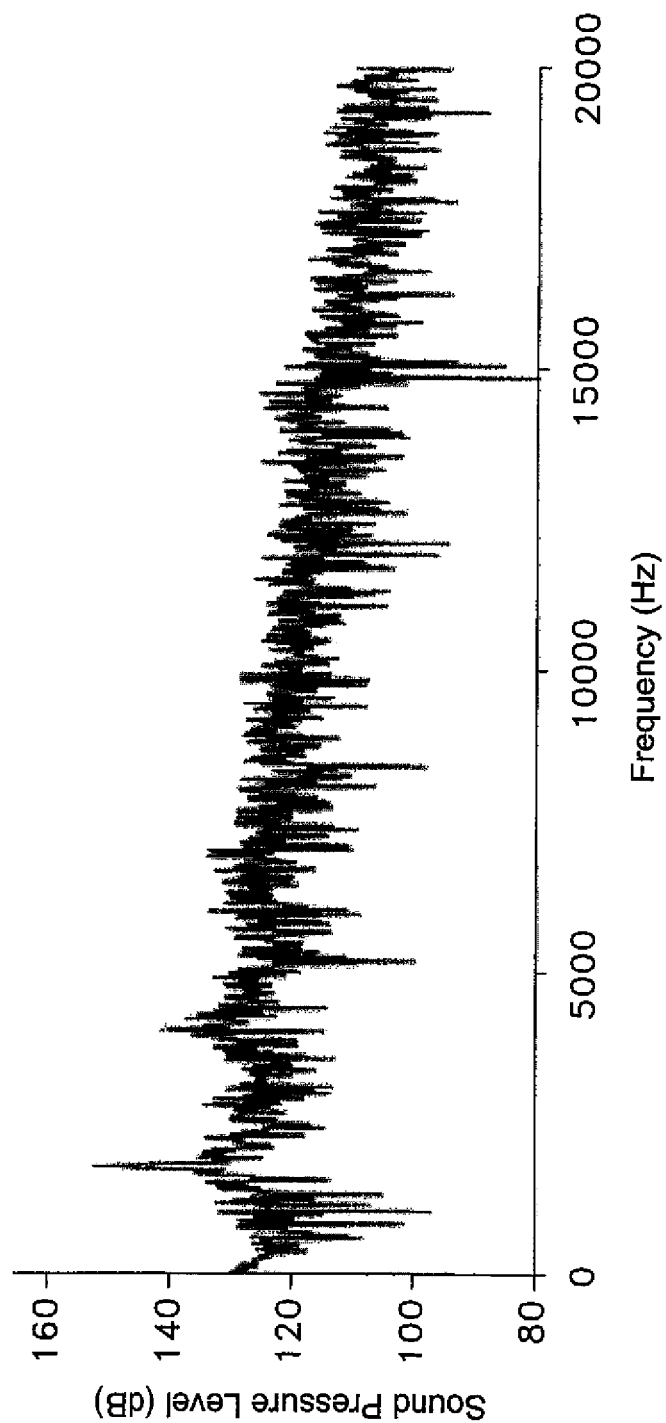
FIG. 8A is a plot of sound pressure level for a main jet at M=0.87, d/h=0.0869 with a baseline jet where the central insertion tube has a length $l_t$=0 mm.
Figure 8B:
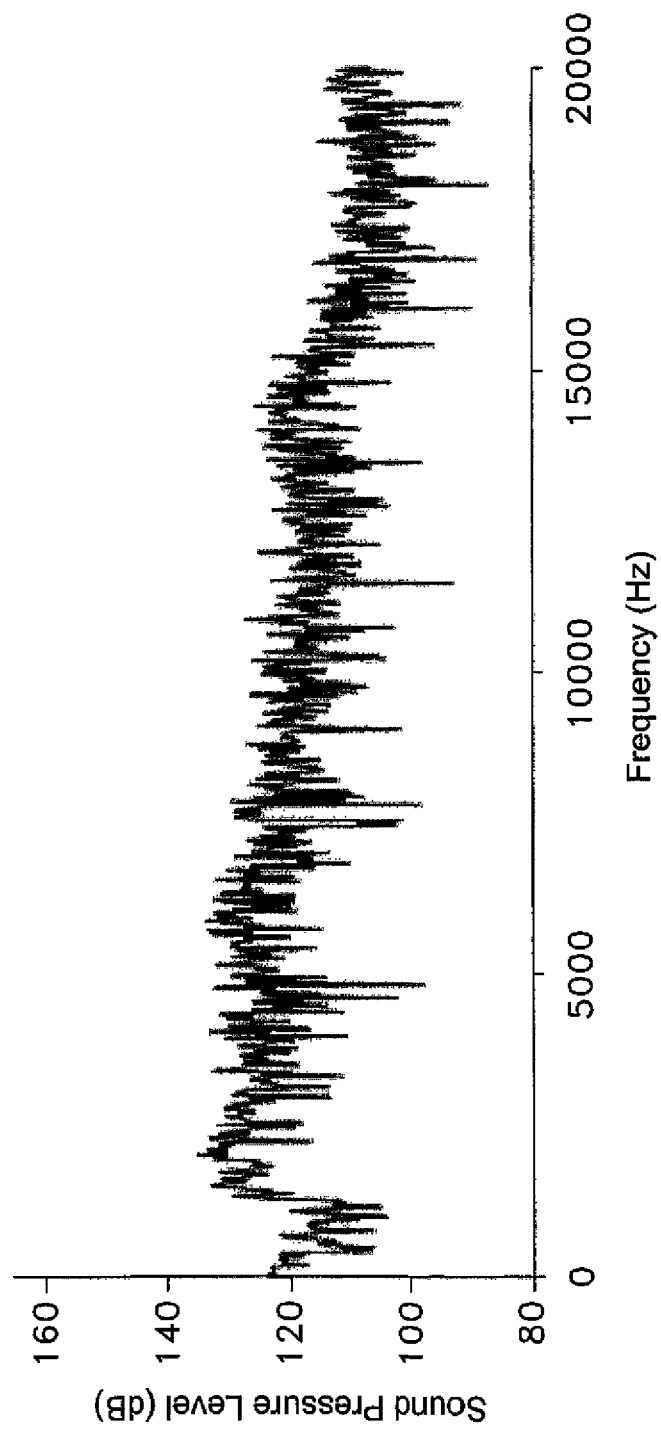
FIG. 8B is a plot of sound pressure level for a main jet at M=0.87, d/h=0.0869 where the central insertion tube has a length d/$l_t$=0.375.
Figure 8C:
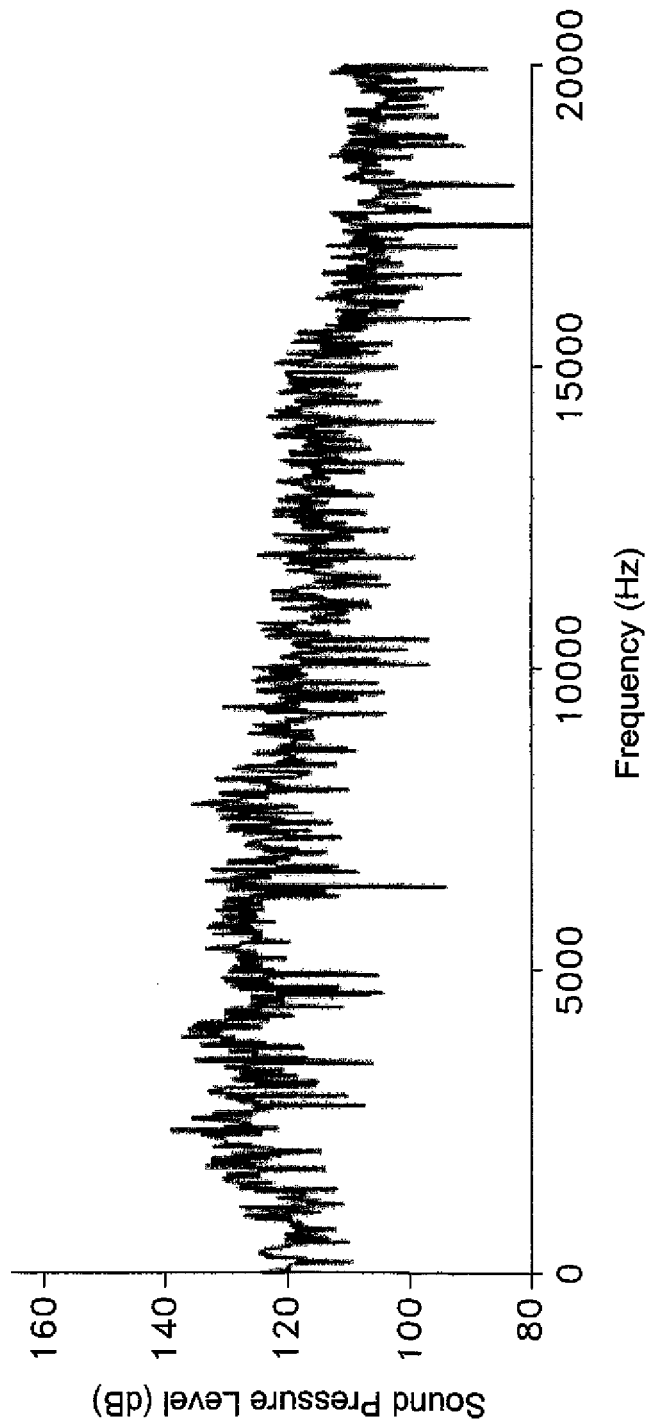
FIG. 8C is a plot of sound pressure level for a main jet at M=0.87, d/h=0.0869 where the central insertion tube has a length d/$l_t$=0.300.
Figure 8D:
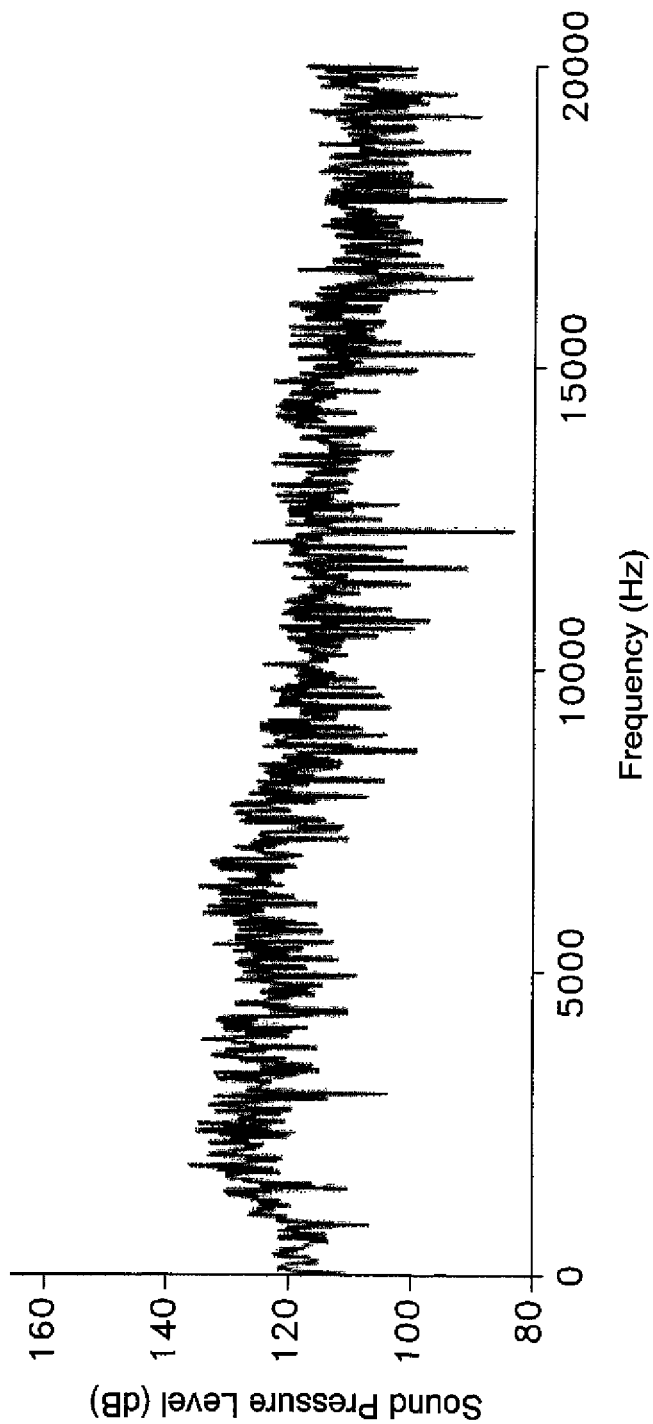
FIG. 8D is a plot of sound pressure level for a main jet at M=0.87, d/h=0.0869 where the central insertion tube has a length d/$l_t$=0.250.

FIGS. 8A, 8B, 8C, and 8D show the SPL for the case of a wedge 106a located at a d/h of 0.0869, with baseline jet, and with central insertion tubes of different lengths, $d/l_t$, specifically $d/l_t$=0.375, 0.300 and 0.250. From these results, when the central insertion tube 114 of length, $d/l_t$=0.300, is inserted into the jet plume 102, the edge-tone is suppressed, which is 28.9 percent of the stand-off distance. So as the central insertion tube 114 length increases, the edge-tone amplitude decreases by limiting the jet oscillation 118. When the central insertion tube 114 length reaches around 30 percent of the stand-off distance, the edge-tone is suppressed dramatically. Specifically, FIGS. 8A, 8B, 8C, and 8D show the comparison of SPL for main jet at M=0.87, d/h=0.0869, and different lengths of central insertion tube 114 without microjet 116 injection, $d/l_t$, where FIG. 8A is a baseline jet where $l_t$=0 mm, FIG. 3b is $d/l_t$=0.375, FIG. 3c is $d/l_t$=0.300, and FIG. 3d is $d/l_t$=0.250.

It is to be understood that the present invention is not limited to the embodiments described above, but encompasses any and all embodiments within the scope of the following claims.

We claim:

1. A passive edge-tone suppression method, comprising the steps of:
   inserting a central insertion tube within a nozzle ejecting a jet, wherein the central insertion tube is imperforate, being devoid of microjets;
   extending the central insertion tube through the nozzle and into alignment with an edge disposed in the path of the jet; and
   selecting the central insertion tube so that the central insertion tube has a length of about 30 percent of a stand-off distance between the nozzle and the edge.

2. The passive edge-tone suppression method according to claim 1, wherein the central insertion tube is inserted within a center of the nozzle.

3. The passive edge-tone suppression method according to claim 1, wherein the central insertion tube has a diameter of about 200 micrometers.

* * * * *